(12) United States Patent
Driss et al.

(10) Patent No.: US 10,220,341 B2
(45) Date of Patent: Mar. 5, 2019

(54) FILTER FRAME ASSEMBLY

(71) Applicant: CAMFIL USA, INC., Riverdale, NJ (US)

(72) Inventors: Mohamed Zied Driss, Clifton, NJ (US); Joseph John Gorman, Pompton Lakes, NJ (US); Donald Dean Thornburg, Jr., Kinnelon, NJ (US)

(73) Assignee: CAMFIL USA, INC., Riverdale, NJ (US)

( * ) Notice: Subject to any disclaimer, the term of this patent is extended or adjusted under 35 U.S.C. 154(b) by 106 days.

(21) Appl. No.: 15/389,008

(22) Filed: Dec. 22, 2016

(65) Prior Publication Data

US 2018/0178153 A1    Jun. 28, 2018

(51) Int. Cl.
*B01D 46/00* (2006.01)
*B01D 46/10* (2006.01)
*B01D 46/52* (2006.01)

(52) U.S. Cl.
CPC ..... *B01D 46/0016* (2013.01); *B01D 46/0024* (2013.01); *B01D 46/10* (2013.01); *B01D 46/521* (2013.01); *B01D 2265/06* (2013.01)

(58) Field of Classification Search
CPC ............ B01D 46/0016; B01D 46/0024; B01D 46/10; B01D 46/521
See application file for complete search history.

(56) References Cited

U.S. PATENT DOCUMENTS

| | | | | |
|---|---|---|---|---|
| 2,965,197 | A * | 12/1960 | Dow ...................... | B01D 46/10 55/511 |
| 3,938,973 | A * | 2/1976 | Kershaw ............ | B01D 46/0016 55/501 |
| 5,782,944 | A * | 7/1998 | Justice ................... | B01D 46/10 55/495 |
| 6,004,656 | A * | 12/1999 | Gosselin ................... | G09F 3/02 428/198 |
| 2007/0284424 | A1 * | 12/2007 | Holley ................... | B65D 71/36 229/101 |
| 2007/0294988 | A1 * | 12/2007 | Miller ................ | B01D 46/0016 55/495 |
| 2010/0269468 | A1 * | 10/2010 | Crabtree .............. | B01D 46/521 55/499 |
| 2017/0028338 | A1 * | 2/2017 | Xin ...................... | B01D 46/521 |

* cited by examiner

*Primary Examiner* — Jason M Greene
(74) *Attorney, Agent, or Firm* — Patterson + Sheridan, LLP

(57) ABSTRACT

Embodiments of the inventions include a filter frame and an air filter. The air filter has filtration media and a wood fiber-based filter frame securing filtration media. The filter frame having an upstream facing surface. The upstream facing surface having an orientation substantially perpendicular to a direction of air flow through the filter. The filter additionally having a plurality of sides coupled to the upstream facing surface, the plurality of sides having an orientation substantially parallel to the direction of air flow through the filter, the direction of air flow through the filter defining an exterior side of the filter frame; and a folded edge defined between the upstream facing surface and a first side of the plurality of sides, the folded edge having a debossing on the exterior side of the filter frame.

13 Claims, 8 Drawing Sheets

FILTER FRAME ASSEMBLY

BACKGROUND OF THE INVENTION

Field of the Invention

Embodiments described herein relate to a panel filter having fiberboard frame and the like.

Description of the Related Art

Many air filtration systems typically utilize air filters having fiberboard filter frames. The fiberboard filter frames are typically die cut from a large sheet and folded to form portions which fit together to secure filter media therebetween.

In use, the air filter is held in an air duct, filter holding frame or other housing of an air handling system where the fiberboard filter frame is exposed to moisture laden air passing through the filter. Some moisture may also coalesce on the upstream surface of the filter media, where the collected moisture, now water, may run off the filter media and come in contact with fiberboard filter frame. After prolonged use, the moisture and collected moisture may penetrate and comprises the fiberboard filter frame, prematurely shorting the life of the air filter.

Thus, there is a need for an improved air filter.

SUMMARY OF THE INVENTION

Embodiments of the inventions include a filter frame and an air filter. The air filter has filtration media and a wood fiber-based filter frame securing filtration media. The filter frame having an upstream facing surface. The upstream facing surface having an orientation substantially perpendicular to a direction of air flow through the filter. The filter additionally having a plurality of sides coupled to the upstream facing surface, the plurality of sides having an orientation substantially parallel to the direction of air flow through the filter, the direction of air flow through the filter defining an exterior side of the filter frame; and a folded edge defined between the upstream facing surface and a first side of the plurality of sides, the folded edge having a debossing on the exterior side of the filter frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that elements of one embodiment may be beneficially incorporated in other embodiments without further recitation.

DETAILED DESCRIPTION

Embodiments of the invention generally provide a filter frame having surfaces that include embossing and debossing for generating folds which are free from scores or other slits that would normally penetrate the surface of the material comprising the filter frame. The lack of scores or slits on the surface substantially prevents moisture penetration into the material comprising the filter frame, thereby extending the life of the filter, particularly when used to filter air streams having high moisture content.

Figure 1:
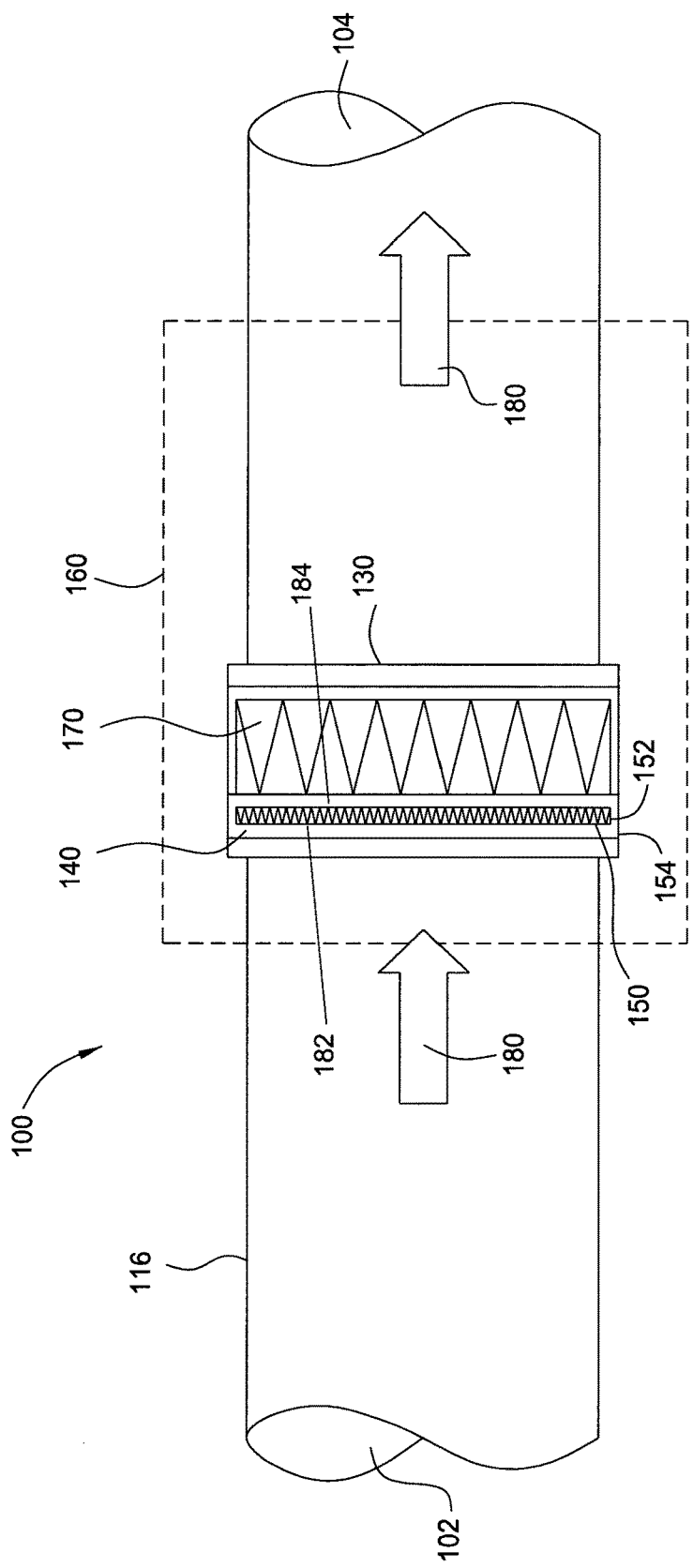
FIG. 1 is a schematic side view of an air handler having a panel filter installed therein, according to one embodiment of the invention.

FIG. 1 is a schematic side view of an air handler 100 having an air filter 154 installed therein, according to one embodiment of the invention. The air handler 100 may include ductwork 116. The air handler 100 has an inlet 102 and an outlet 104. Optionally, a housing 160 may be disposed between the inlet 102 and outlet 104. Air flows through the air handler 100 from the inlet 102 to the outlet 104, as shown by the arrows labeled 180. The air filter 154 may be disposed in the ductwork 116 or the housing 160. Although the air filter 154 is shown mounted inside the air handler 100, it is contemplated that the air filter 154 may be utilized advantageously in or associated with other air moving conduits.

The housing 160 may have one or more filter holding frames 130. One or more of the filter holding frames 130 may each respectively accept one or more air filters, such as the air filter 154. The air filter 154 may be disposed in the air handler 100 as a standalone filter. Optionally, the air filter 154 may be pre-filter 140 utilized to pre-filter air prior to flowing through a primary filter 170 disposed in the housing 160. The separation between the pre-filter 140 to the primary filter 170 in the housing 160 may be kept to a minimum but can also be any distance practical or desired.

Figure 2:
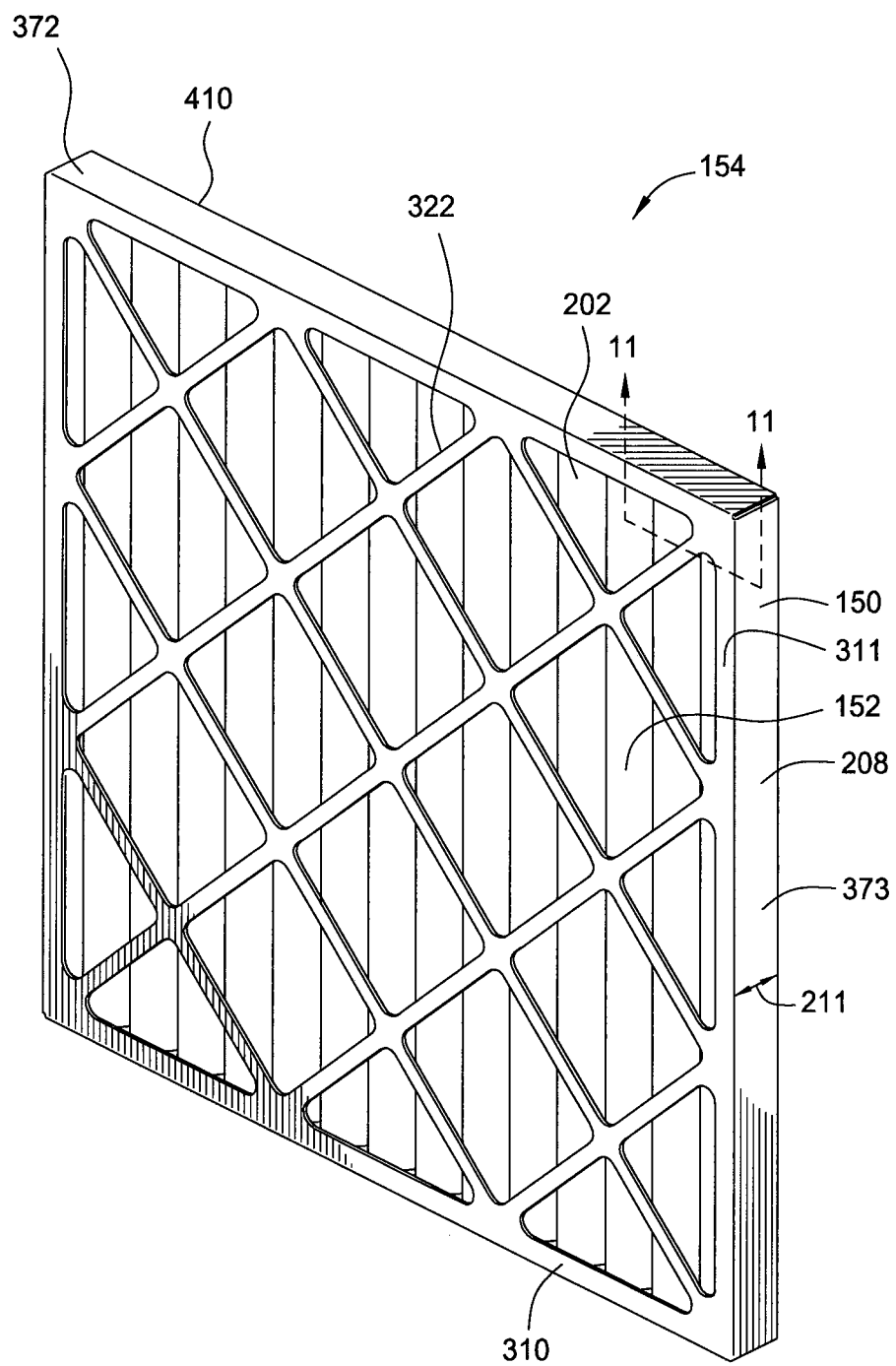
FIG. 2 depicts a front perspective view of the panel filter of FIG. 1.
Figure 3:
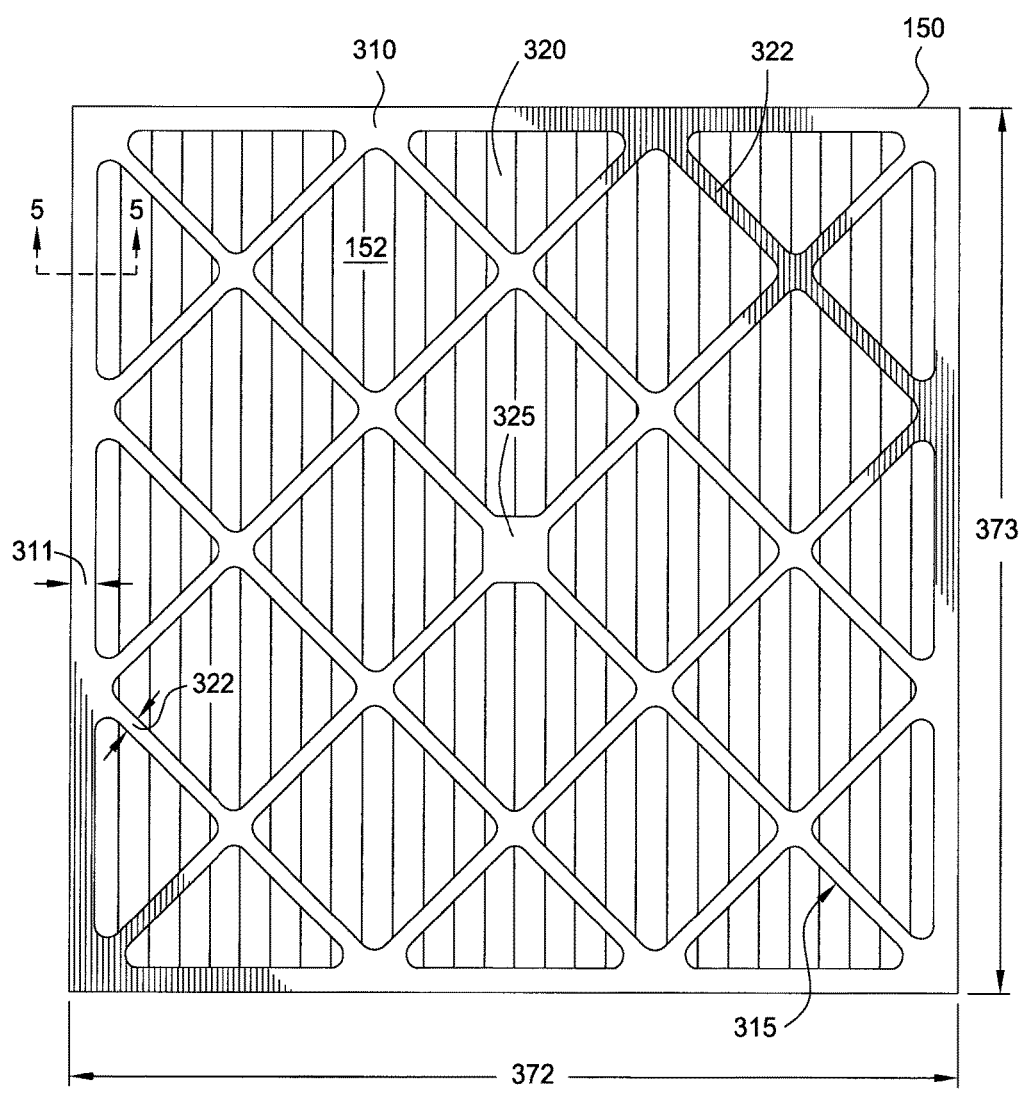
FIG. 3 is a plan view for an upstream half of the air filter according to one embodiment of the invention.

The air filter 154 has a filter frame 150 and filter media 152. The filter frame 150 holds the filter media 152 within the filter frame 150. The air filter 154 will be discussed further with reference to FIGS. 2 and 3. FIG. 2 depicts a front perspective view of the air filter 154 of FIG. 1. FIG. 3 is a plan view of an upstream half 182 of the air filter 154 according to one embodiment of the invention. The filter frame 150 additionally includes a physically separate downstream half 184. The upstream and downstream halves 182, 184 are coupled together to form the completed filter frame 150, sandwiching the filter media 152 therebetween.

The filter media 152 may be formed from one or more of cotton, glass fiber, cellulose, melt blown polymer or other suitable material. The filter media 152 may comprise one or more layers. The filter media 152 may be pleated and include stiffeners' disposed in or on the filter media 152 to keep the spacing of the folds of the pleats, as well as protecting the filter media 152. In one embodiment, the filter media 152 is a blend of cotton and polyester and backed with a corrosion-resistant wire that eliminates distortion of the air filter 154 under high air flow conditions. The filter media 152 may be fully supported by a wire support grid bonded to and/or pleated with the filter media 152. The filter media 152 may have rounded pleats for enhance dust holding capacity and facilitate airflow through the filter media 152.

The upstream half 182 of the air filter 154 has a upstream facing surface 310 and sidewalls 208. The filter frame 150 of the air filter 154 may be formed from separate portions such that the upstream half 182 includes the upstream facing surface 310 while the downstream half 184 includes a downstream facing surface 410. The upstream facing surface 310 is substantially similar to the downstream facing surface 410. The upstream half 182 includes the upstream facing surface 310 and sides 312. The upstream facing surface 310 has an outer perimeter 311 and a plurality of stays 322 forming a plurality of front openings 320 through which air enters the air filter 154 and impinges upon the filter media 152. The front openings 320 may be shaped as one or more of diamonds, rectangles, other polygons, or even curved shapes such as ovals and circles. The downstream half 184 of the filter frame 150 may be similarly configured.

The filter frame 150 may be formed from a plant-based product, such as wood fiber-based materials. Some suitable examples include fiberboard, cardboard, paperboard and corrugated fiberboard, among others. Surfaces of the upstream facing surface 310 and sides 312 of the filter frame 150 facing away from the filter media 152 may have a coating that improves water resistance relative to the uncoated side. The coating may be paint or other water resistant coating. The coating enhances the filter frame 150 resistance to moisture. In one embodiment, the material of the filter frame 150 is coated with china clay, calcium carbonate, titanium dioxide or other suitable material. For example, the filter frame 150 may be formed from a beverage board material.

The filter frame 150 may be generally rectangular in shape. Two opposing sidewalls 208 of the filter frame 150 may have a first length 373 while the other two opposing sidewalls 208 may have a second length 372. All four sidewalls 208 may have a similar width 211. Once assembled, the upstream facing surface 310 and the downstream facing surface 410 may be substantially parallel. The first length 373 may be between about 63 centimeters and about 39 centimeters. The second length 372 may be between about 63 centimeters and about 24 centimeters. The width 211 may be between about 3 centimeters and about 6 centimeters. However it should be appreciated that the width 211, the first length 373 and second length 372 may deviate outside these ranges without deviating from the embodiments of the invention disclosed herein.

Figure 4:
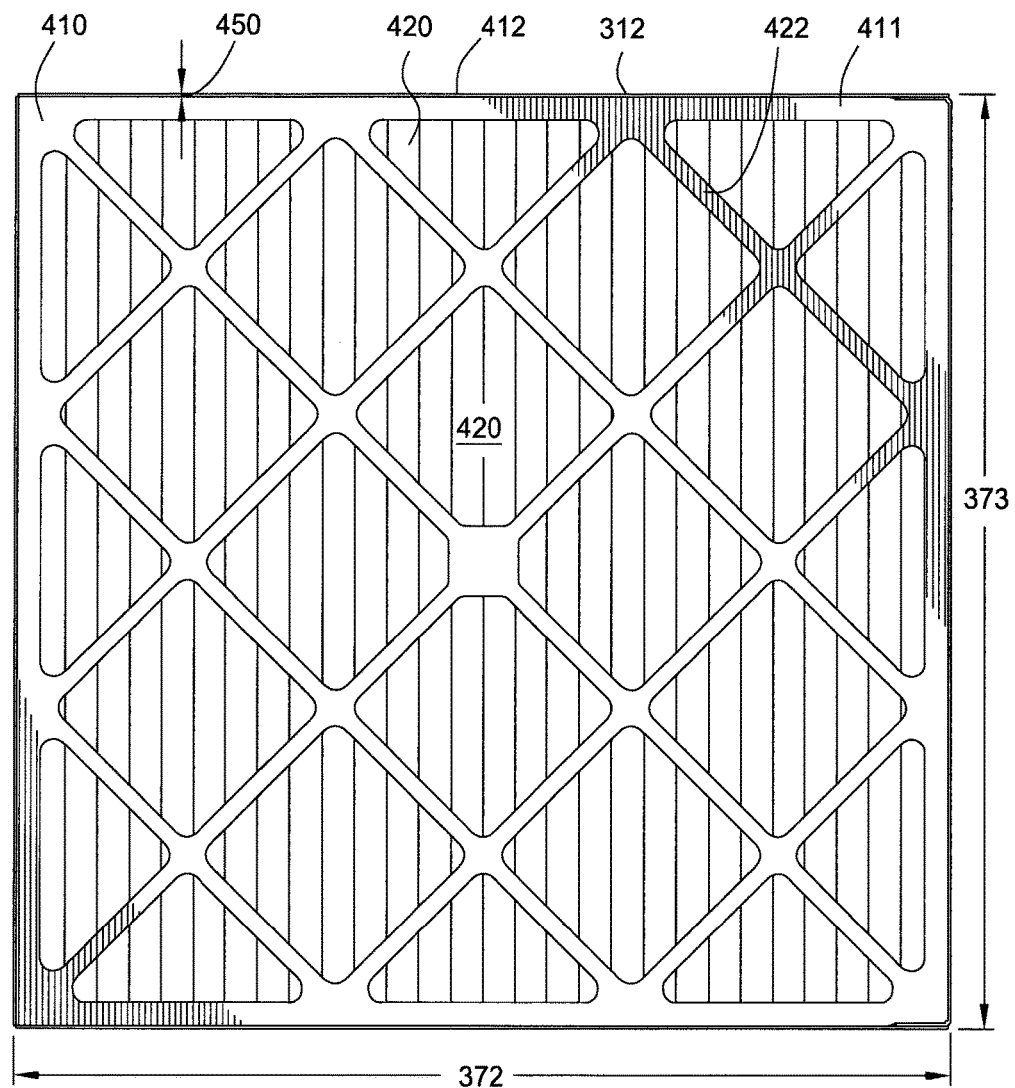
FIG. 4 is a plan view for a downstream half of the air filter according to one embodiment of the invention.

FIG. 4 is a plan view for a downstream half 184 of the air filter 154, according to one embodiment of the invention. The downstream half 184 of the air filter 154 includes The downstream facing surface 410 has an outer perimeter 411, and stays 422 which are substantially similar to that of the upstream facing surface 310. A rear opening 420 may be formed by the outer perimeter 411, and stays 422. The rear openings 420 may align with and be substantially similar to the front openings 320. The rear and front openings 420, 320 are configured to promote airflow through the air filter 154.

Figure 5:
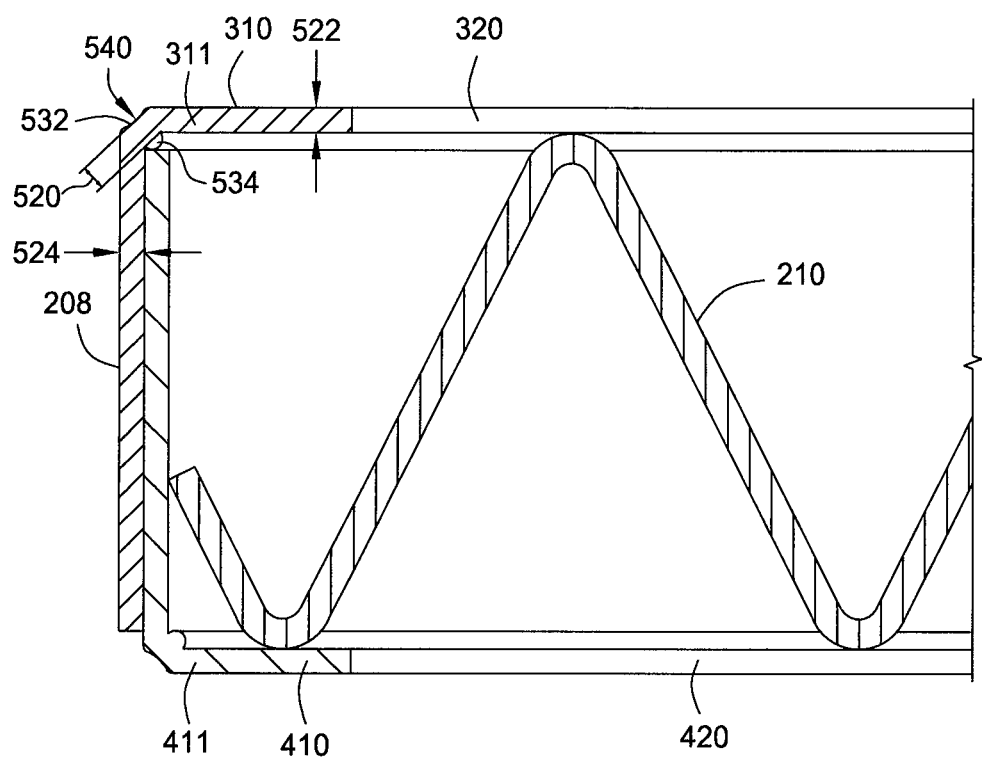
FIG. 5 is a partial cross sectional view taken through section line 5-5 shown in FIG. 3.

The filter frame portion, having the downstream facing surface 410, has sides 412. The sides 412 of the filter frame portion having the downstream facing surface 410 are disposed inward of the sides 312 of the filter frame portion having the upstream facing surface 310. This relationship between sides 312 and side 412 is pointed out by an arrow 450. The sides 312, 412 may be adhered or fastened to each other where they overlap. In one embodiment, the sides 312, 412 are glued together. The overlap between the sides 312, 412 is better depicted in a partial cross sectional view of FIG. 5 taken through section line 5-5 shown in FIG. 3. In the cross section sectional view of FIG. 5, the side 208 attached to the upstream facing surface 310 overlaps the side 412 attached to the downstream half 184.

The upstream facing surface 310 and the side 312 interface at a corner 530. The corner 530 has an embossing 534 on the side of the upstream half 182 facing away from the filter media 152. Conversely, the corner 530 has a debossing 532 on the side of the upstream half 182 facing towards the filter media 152. The corner 530 has material of the thickness 520 which is substantially similar to a thickness 522 of the outer perimeter 311 along the upstream facing surface 310 and the side 312. Thus, there is no thinning of the material in the corner 530. Additionally the embossing 534 prevents portions of the thickness 520 underlying the surface of the fiberboard from being exposed to moisture, and also does not damage or compromise (i.e., break through) the coating, and thus prevents the coating applied to the filter frame 150 from being interrupted thereby providing moisture resistance. Consequently, the corner 530 may have a lifespan substantially similar to the upstream facing surface 310 and not present a weak spot for potential failure that will shorten the lifespan of the air filter 154 due to moisture infiltration of the frame material.

Figure 6:
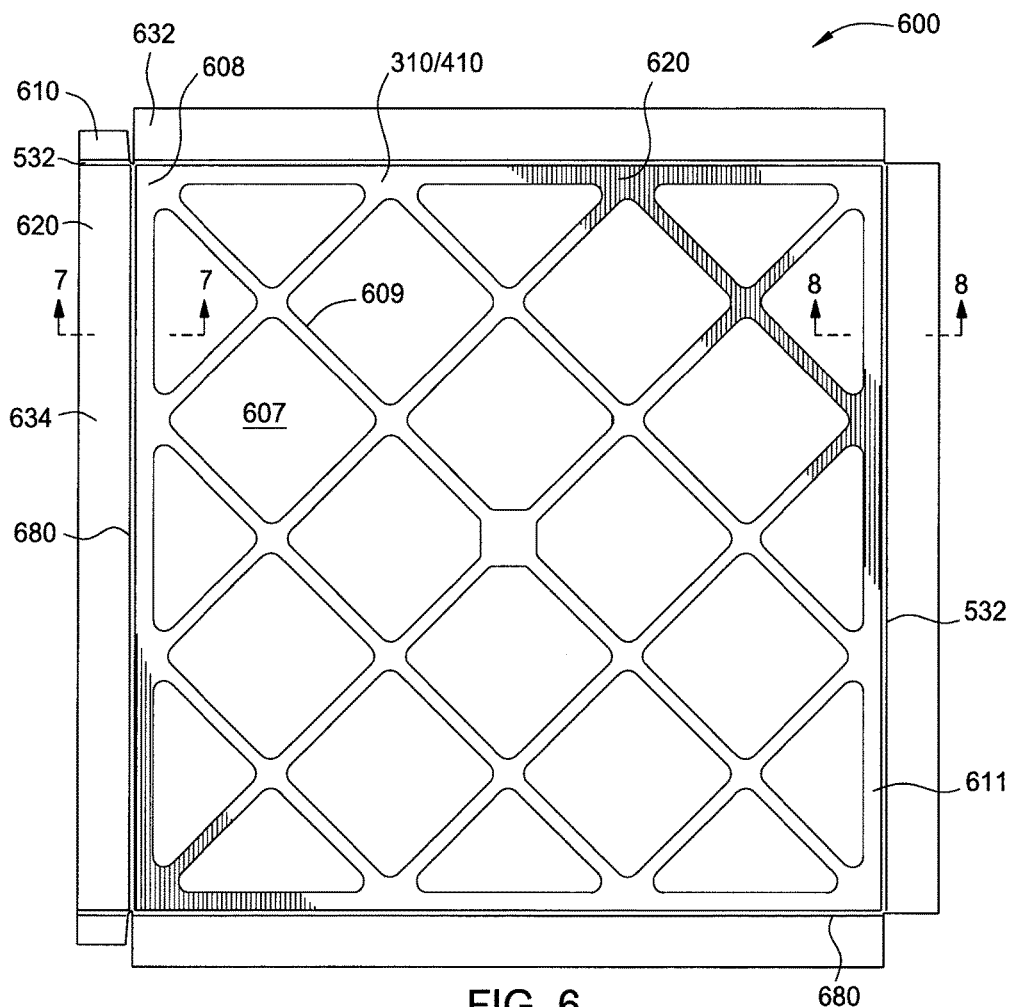
FIG. 6 illustrates a top view for a first cover portion of the filter frame.
Figure 7:
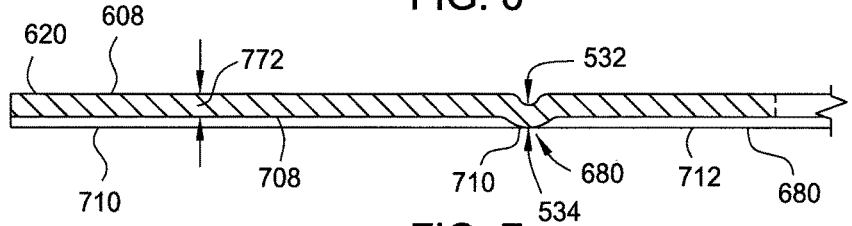
FIG. 7 is a partial cross sectional view taken through section line 7-7 shown in FIG. 6.
Figure 8:
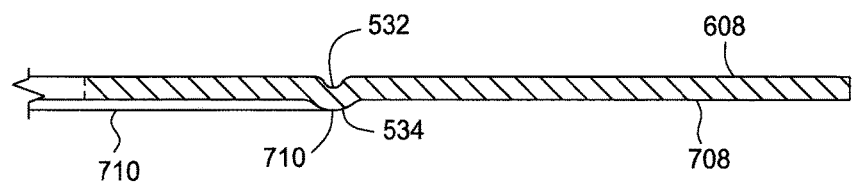
FIG. 8 is a partial cross sectional view taken through section line 8-8 shown in FIG. 6.

The downstream facing surface 410 and the upstream facing surface 310 are subassemblies of the filter frame 150. That is, the upstream facing surface 310 and the sides 312 are of a first cover portion and the downstream facing surface 410 and sides 412 are of a second cover portion. Wherein the first cover portion and the second cover portion form the filter frame 150. The construction of the air filter 154 advantageously having the corners 530 will now be discussed relative to the first cover portion 600 of the filter frame 150. However, it should be appreciated that the discussion is equally applicable to the second cover portion as well. FIG. 6 illustrates a top view for the first cover portion 600 of the filter frame 150. FIGS. 7 and 8 will also be used to discuss the first cover portion 600. FIG. 7 is a partial cross sectional view taken through section line 7-7 shown in FIG. 6. FIG. 8 is a partial cross sectional view taken through section line 8-8 shown in FIG. 6.

The first cover portion 600 any be formed from water-resistant material, such as beverage board, that will stand up to conditions in an HVAC system with little to no distortion or blowouts of the air filter 154. The first cover portion 600 may be cut by any suitable method from a larger sheet. For example, the first cover portion 600 may be die cut from a lager sheet of fiber board.

The first cover portion 600 has a top surface 620 and a bottom surface 720 opposite the top surface 620. The top surface 620 corresponds to the upstream facing surface 310 of the first cover portion and the downstream facing surface 410 of the second cover portion. The first cover portion 600 has an outer perimeter 611, a top face 608, a first side 632, a second side 634 and tabs 610. The first cover portion 600 also has stays 609 defining openings 607. The debossing 532 is disposed between each of the respective first side 632, second side 634 and tabs 610 along the outer perimeter 611 of the top face 608 to form a folded edge 680.

Embossing and debossing are the processes of creating either raised or recessed reliefs in a material such as beverage board. An embossed pattern is raised against the background, while a debossed pattern is sunken into the surface of the material. The debossing 532 is more clearly seen in the cross-sectional views of FIGS. 5, 7 and 8.

The debossing 532 on the top surface 620 forms a protrusion 710 which extends outward from a bottom surface 720. The debossing 532 extends along a length of the top surface 620 to form a ridge 712 on the bottom surface 708. Multiple ridges 712 may cross at an intersection 744. At a bottom surface 708, opposite the top surface 620, a embossing 534 is formed opposite the debossing 532. The combination of debossing 532 and embossing 534 forms a crease in the material of the first cover portion 600 where the folded edge 680 is formed. Additionally, a material thickness 772 of the first cover portion 600 is consistent throughout and unaltered by the debossing 532 or embossing 534. Thus, the structural integrity of the first cover portion 600 is not compromised by the debossing 532 along the folded edge 680 of the filter frame 150. Thus, extending the life of the filter frame 150.

In one embodiment, a sheet of beverage board is cut into the form of the first cover portion 600. The sheet may be cut buy any suitable method such as die cutting. The fold lines are formed in the first cover portion 600. The fold lines may be debossed while dies cutting. Alternately, the fold lines may be debossed with a break or rotary tool.

Figure 9:
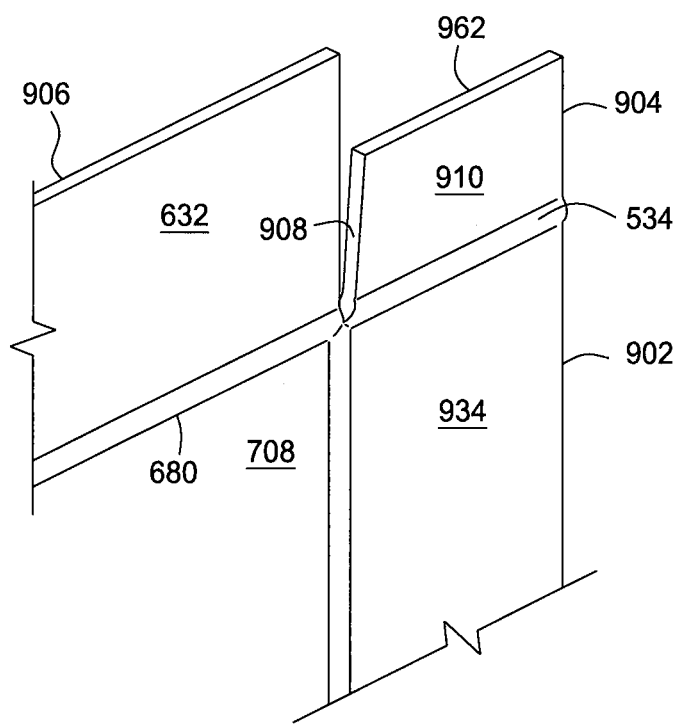
FIG. 9 is a partial perspective view for a corner of the filter frame shown in FIG. 6.

Forming the first cover portion 600 into the filter frame will now be discussed with respect to FIGS. 9 and 10. FIG. 9 is a partial perspective view for a corner of the first cover portion 600 shown in FIG. 6. Illustrated is the outer perimeter 611, the first side 632, the second side 634 and one of the tabs 610. The embossing 534 is disposed between each of the bottom surface 708, the first side 632, second side 634 and the tab 610.

The tab 610 has an inner tab surface 908, an outer tab surface 904 and a tab edge 962. The second side 634 has an outer side surface 902. The first side surface 632 has a side edge 906. The tab 610 is hinged by the embossing 534. As illustrated, a tab bottom surface 910 is being folded over the embossing 534 toward a bottom side surface 934 of the second side 634. In this operation, the tab bottom surface 910 is folded over the embossing 534 toward the bottom side surface 934. The numbered surfaces described in FIG. 9 are carried over to FIG. 10 to show the final location for the numbered surfaces.

Figure 10:
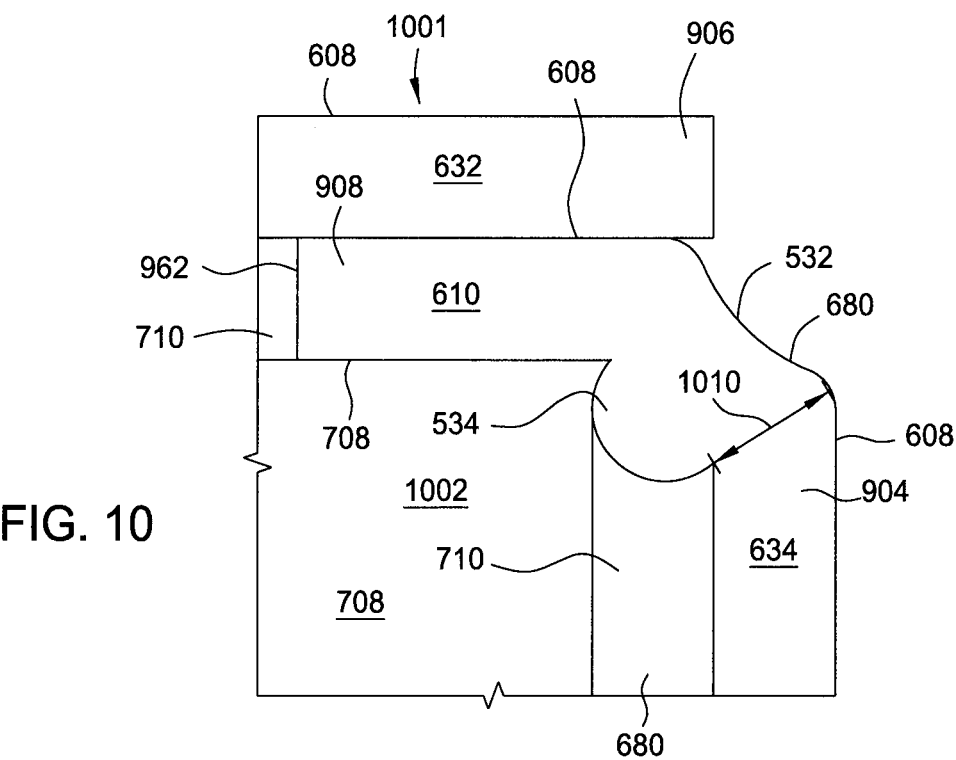
FIG. 10 is a partial plan view of the corner of the filter frame shown in FIG. 9 folded together prior to assembly.

FIG. 10 is a partial plan view of the corner of the first cover portion 600 of the filter frame 150 shown in FIG. 9. The first cover portion 600 is folded over each of the embossing 534 along the folded edge 680 in assembly of the filter frame 150 which places the embossing in an interior portion 1002 of the filter frame 150. The debossing 532 is now along an exterior 1001 of the final assembly of the filter frame 150. A thickness 1010 of the folded edge 680 is substantially similar to the thickness of the material portion of the filter frame 150. Therefore, the structural integrity of the folded edges 680 are not diminished or compromised by the fold.

Figure 11:
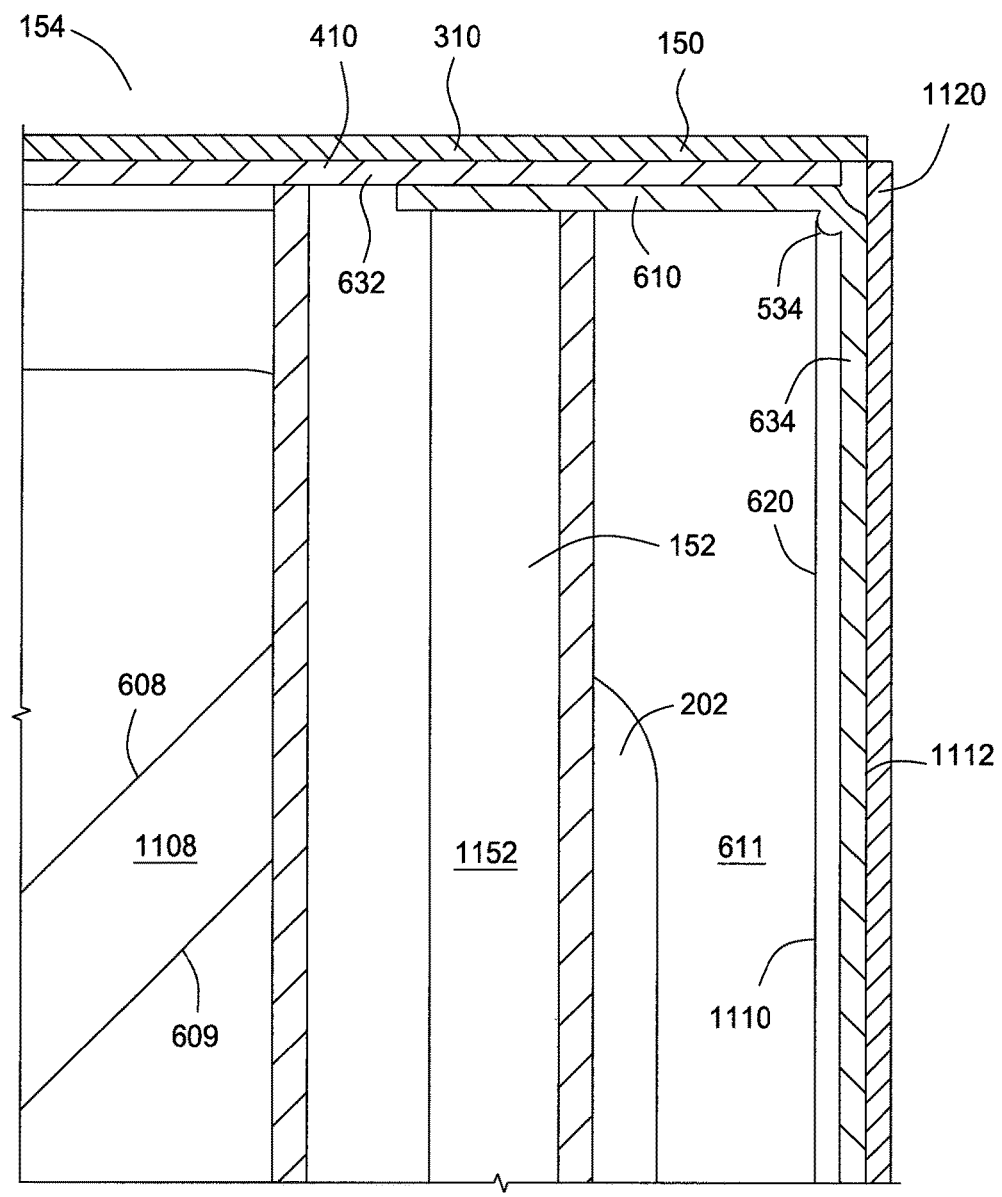
FIG. 11 is a cross-sectional view of the panel filter taken through section line 11-11 shown in FIG. 1.

Now turning to FIGS. 1 and 11, the final assembly of the air filter 154 having the filter frame 150 is disclosed. FIG. 11 is a cross-sectional view of the air filter 154 taken through section line 11-11 shown in FIG. 1. The cross section of the air filter 154 is through a pleat 1152 in the filter media 152 as well as the filter frame 150. A bottom face 1108, opposite the top face 608, is visible for the stays 609 and the outer perimeter 611.

The upstream facing surface 310 is disposed on an outside surface 1112 of the downstream facing surface 410. In this manner, the folded edges 680 prevent the dust and air flowing at the upstream facing surface 310 from pulling the upstream facing surface 310 and downstream facing surface 410 apart. Additionally, the folded edges 680, having additional material from the embossing 534 strengthen the connection between the tab 610, first and second sides surfaces 632, 634 as well as the outer perimeter 611, prevent the air flowing through the air filter 154 openings 202 and entering an interior 1110 of the air filter 154 from breaking, or pulling apart, the folded edges 680. Advantageously, the embossing and debossing strengthens the folded edges 680 to a strength comparable to a remainder to the filter frame 150. Thus removing a week location in the filter frame 150 and extending the service life of the filter frame 150 and likewise, the air filter 154.

While the foregoing is directed to embodiments of the invention, other and further embodiments of the invention may be devised without departing from the basic scope thereof, and the scope thereof is determined by the claims that follow.

The invention claimed is:

1. An air filter, comprising:
   a filtration media; and
   a wood fiber-based filter frame securing the filtration media, the filter frame comprising:
   an upstream facing surface having an orientation substantially perpendicular to a direction of air flow through the filter; and
   a plurality of sides coupled to the upstream facing surface, the plurality of sides having an orientation substantially parallel to the direction of air flow through the filter, the direction of air flow through the filter defining an exterior side of the filter frame; and
   a folded edge defined between the upstream facing surface and a first side of the plurality of sides, the folded edge being about 90 degrees and having a debossing on the exterior side of the filter frame and an embossing on an interior surface of the filter frame, wherein a thickness of material for the upstream facing surface and the folded edge are substantially similar.

2. The air filter of claim 1, wherein the filter frame further comprises:
   a coating disposed on the exterior side of the filter frame.

3. The air filter of claim 2, wherein a material of the wood fiber-based filter frame is water resistant cardboard.

4. The air filter of claim 1, wherein the filter frame further comprises:
   a downstream facing surface having an orientation substantially perpendicular to the direction of air flow through the filter; and
   a plurality of downstream sides coupled to the downstream facing surface, the plurality of downstream sides having an orientation substantially parallel to the direction of air flow through the filter, a second folded edge defined between the downstream facing surface and a second side of the plurality of downstream sides, the second folded edge having a second debossing on the exterior side of the filter frame, and wherein the plurality of downstream sides overlap the plurality of sides for the upstream facing surface.

5. The air filter of claim 4, wherein the first side is disposed on the exterior side of the second side and a bond is formed between the first and second sides.

6. The air filter of claim 4, wherein the filter media is disposed between the downstream facing surface and the upstream facing surface.

7. A filter frame, comprising:
   an upstream facing surface having an orientation substantially perpendicular to a direction of air flow through the filter; and
   a plurality of sides coupled to the upstream facing surface, the plurality of sides having an orientation substantially parallel to the direction of air flow through the filter, the direction of air flow through the filter defining an exterior side of the filter frame; and
   a folded edge defined between the upstream facing surface and a first side of the plurality of sides, the folded edge being about 90 degrees and having a debossing on the exterior side of the filter frame and an embossing on an interior surface of the filter frame, wherein a thickness of material for the upstream facing surface and the folded edge are substantially similar.

8. The filter frame of claim 7, wherein the filter frame further comprises:
   a coating disposed on the exterior side of the filter frame.

9. The filter frame of claim 8, wherein a material of the filter frame is water resistant cardboard.

10. The filter frame of claim 7, wherein the filter frame further comprises:
    a downstream facing surface having an orientation substantially perpendicular to the direction of air flow through the filter; and
    a plurality of downstream sides coupled to the downstream facing surface, the plurality of downstream sides having an orientation substantially parallel to the direction of air flow through the filter, a second folded edge defined between the downstream facing surface and a second side of the plurality of downstream sides, the second folded edge being about 90 degrees and having a second debossing on the exterior side of the filter frame, and wherein the plurality of downstream sides overlap the plurality of sides for the upstream facing surface.

11. The filter frame of claim 10, wherein the first side is disposed on the exterior side of the second side and a bond is formed between the first and second sides.

12. The air filter of claim 4, further comprising:
    a first bossing on a first interior side of the filter frame along the folded edge, the bossing disposed adjacent an edge of the plurality of downstream sides; and
    a second bossing on a second interior side of the filter frame along the second folded edge, the second bossing exposed to the filter media and the second debossing adjacent to a second edge of the plurality of sides.

13. The filter frame of claim 10, further comprising:
    a bossing on an interior side of the filter frame along the folded edge, the bossing disposed adjacent an edge of the plurality of downstream sides.

* * * * *